(12) United States Patent
Wang et al.

(10) Patent No.: US 9,854,426 B1
(45) Date of Patent: Dec. 26, 2017

(54) ASSISTED CELLULAR DEVICE ACTIVATION

(71) Applicant: Verizon Patent and Licensing Inc., Arlington, VA (US)

(72) Inventors: Carl Wang, Syosset, NY (US); Quentin N. Robinson, Willingboro, NJ (US); Shamik Basu, Lake Hiawatha, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/295,324

(22) Filed: Oct. 17, 2016

(51) Int. Cl.
*H04W 4/00* (2009.01)
*H04W 8/02* (2009.01)
*H04M 1/725* (2006.01)

(52) U.S. Cl.
CPC ........... *H04W 8/02* (2013.01); *H04M 1/7253* (2013.01); *H04M 1/72525* (2013.01)

(58) Field of Classification Search
None
See application file for complete search history.

(56) References Cited

U.S. PATENT DOCUMENTS

| | | | | |
|---|---|---|---|---|
| 8,985,442 B1* | 3/2015 | Zhou | | G06Q 30/02 235/375 |
| 9,182,965 B2* | 11/2015 | Khushraj | | G06F 8/61 |
| 9,342,829 B2* | 5/2016 | Zhou | | G06Q 30/02 |
| 9,563,890 B2* | 2/2017 | Zhou | | G06Q 20/3278 |
| 9,576,285 B2* | 2/2017 | Zhou | | G06Q 20/3278 |
| 9,712,660 B2* | 7/2017 | Marcos | | H04M 1/72527 |
| 9,742,997 B1* | 8/2017 | Bamberger | | H04N 5/23241 |
| 2014/0056433 A1* | 2/2014 | Emerson, III | | G06F 17/30743 381/56 |
| 2015/0193785 A1* | 7/2015 | Besehanic | | G06Q 30/0201 705/7.32 |
| 2015/0213504 A1* | 7/2015 | Katz | | G06Q 30/0272 705/14.64 |
| 2015/0282227 A1* | 10/2015 | Yousef | | G06F 1/163 455/39 |
| 2016/0173359 A1* | 6/2016 | Brenner | | G06F 19/00 600/301 |
| 2016/0253651 A1* | 9/2016 | Park | | G06F 3/0482 705/39 |

* cited by examiner

*Primary Examiner* — Tuan A Tran

(57) ABSTRACT

A user device installs a third-party companion application with a primary software development kit (SDK) for cellular service activation on a wearable device, the wearable device including a third-party device application having an embedded SDK for the cellular service activation. The user device receives user input to initiate the cellular service activation for the wearable device and solicits, via the primary SDK, user input for account settings associated with the cellular service activation. The user device obtains, via the primary SDK and from a network device, activation parameters, associated with the wearable device, for the cellular service activation. The user device forwards, via the primary SDK and to the embedded SDK of the wearable device, the activation parameters, which the embedded SDK uses to request cellular activation.

20 Claims, 12 Drawing Sheets

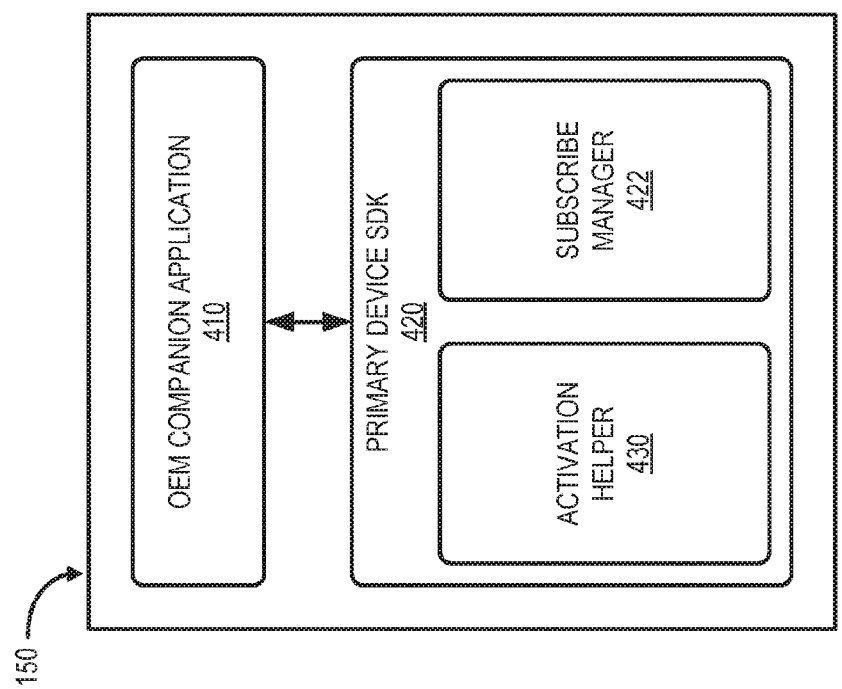

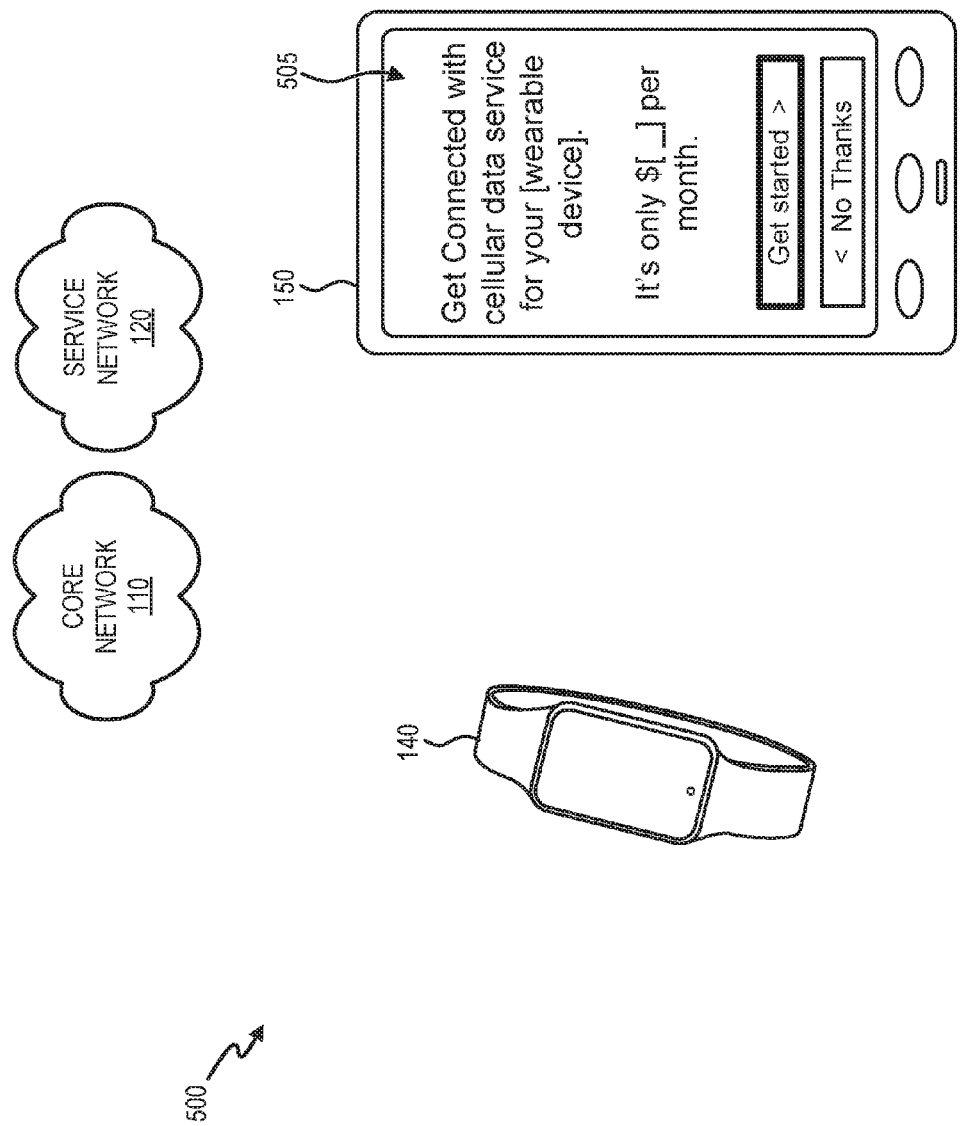

ASSISTED CELLULAR DEVICE ACTIVATION

BACKGROUND

In the wearable industry, hardware can have a wide variety of configurations, with some devices having no screen while other devices have small screens of less than 1.5 inches. Activating cellular service on these wearable devices can be challenging, especially if there is minimal screen space (or sometimes no screen at all) on the wearable device to guide a user through the activation process. The activation process typically requires several steps that may be specific to a particular carrier or cellular service provider.

BRIEF DESCRIPTION OF THE DRAWINGS

FIG. 4 is a diagram of functional components of the primary device of FIG. 1;

FIGS. 5A-5G are diagrams illustrating exemplary communications among network elements in apportion of the network of FIG. 1.

DETAILED DESCRIPTION OF PREFERRED EMBODIMENTS

The following detailed description refers to the accompanying drawings. The same reference numbers in different drawings may identify the same or similar elements.

Cellular data service is becoming a more popular option for wearable electronic devices, such as fitness bands, activity trackers, clip-on monitors, etc. A companion application for use on a smartphone (or other computing device) is sometimes made available with a wearable electronic device (referred to herein as simply "wearable device"). Systems and methods described herein may perform cellular activation for wearable devices by allowing the companion application on a primary device (e.g., a smartphone) to communicate directly with a wearable device. The activation process may be performed, in part, by the primary device on behalf of the wearable device. A pair of software development kits (SDKs) is embedded within original equipment manufacturer (OEM) software (or other third-party software) for the wearable device. More particularly, a wearable SDK is included within an OEM device application for the wearable device, and a primary device SDK is included within an OEM companion application for the primary device. Secure communications between the wearable device SDK and the primary device SDK to facilitate activation may be conducted via a local connection. Using these secure communications, cellular activation of the wearable device may be performed without the assistance of, for example, a service representative for a particular wireless carrier or cellular service provider.

Figure 1:
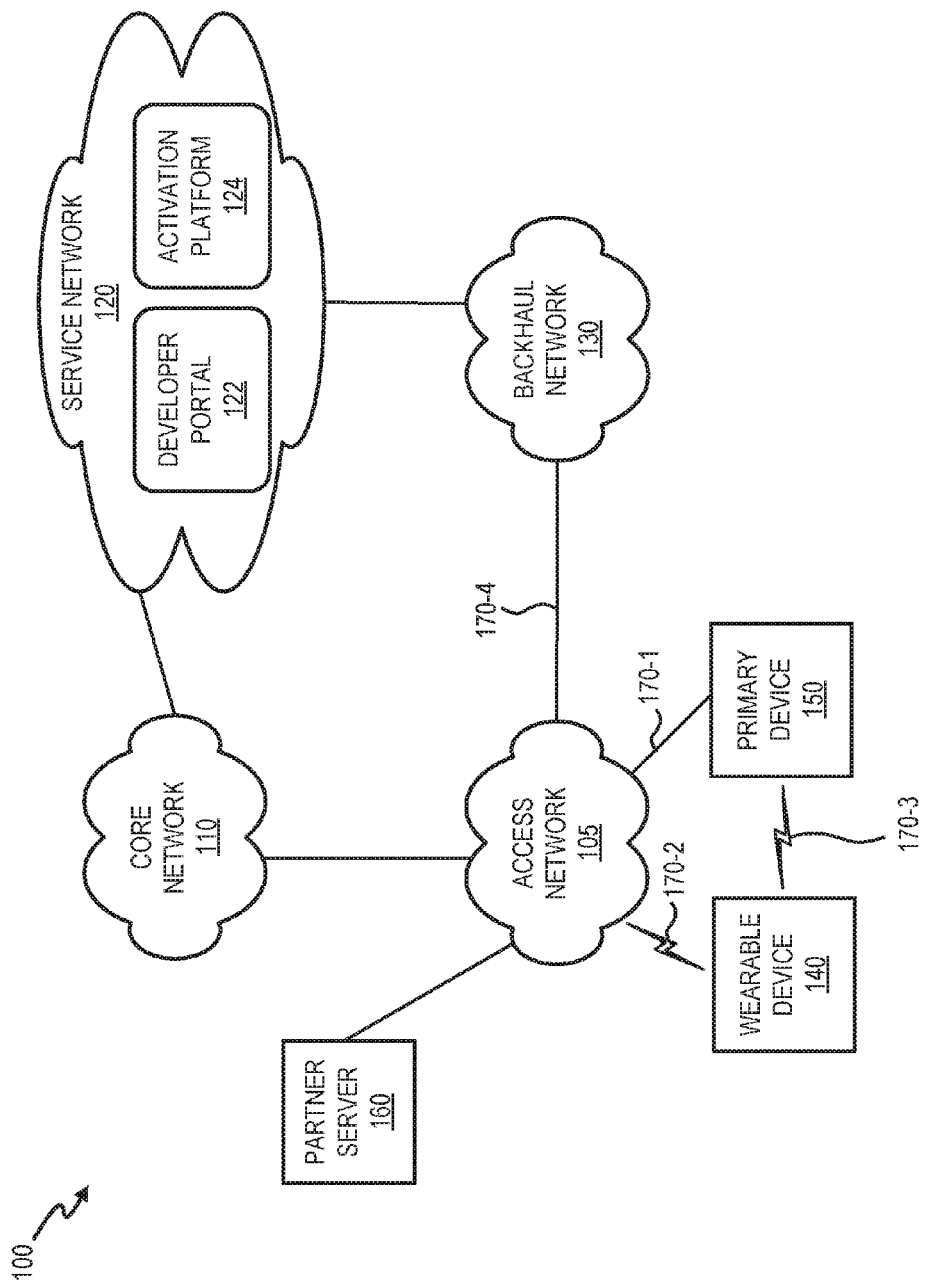
FIG. 1 is a diagram illustrating an exemplary network in which systems and/or methods described herein may be implemented.

FIG. 1 is a diagram illustrating an exemplary environment 100 in which systems and methods described herein may be implemented. As illustrated, environment 100 may include an access network 105, a core network 110, a service network 120, and a backhaul network 130. Service network 120 may have multiple network elements including, but not limited to, a developer portal 122 and an activation platform 124. Environment 100 may also include a wearable device 140, a primary device 150, and a partner server 160. For purposes of description, wearable device 140, primary device 150, and partner server 160 may be considered network elements within environment 100.

As further illustrated, environment 100 includes communicative links 170 between the network elements and networks (although only four are referenced in FIG. 1 as links 170-1, 170-2, 170-3, and 170-4). A network element may transmit and receive data via a link 170. Environment 100 may be implemented to include wireless and/or wired (e.g., electrical, optical, etc.) links 170. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 170 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be numerous wearable devices 140, primary devices 150, partner servers 160, and so forth. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a Third Generation (3G) RAN, a Fourth Generation (4G) RAN, a 4.5G RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. In aspects where access network includes a RAN, devices (e.g., wearable device 140, primary device 150) may require activation by a service provider to use access network 105. In other aspects, Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complementary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, service network 120 includes developer portal 122 and activation platform 124. According to other exemplary embodiments, developer portal 122, activation platform 124, and/or a portion thereof may be implemented in core network 110.

Developer portal 122 may include one or more network devices that provide software application development services. Among other services, the software application development services provide access to and use of SDKs that may be used to develop OEM device applications (also referred to as "third-party device applications") for wearable devices 140 and OEM companion applications (also referred to as "third-party companion applications") for primary devices 150. The SDKs may include a wearable SDK for inclusion within an OEM device application for the wearable device. The SDKs may also include a primary device SDK for inclusion within an OEM companion application for the primary device.

Additionally, SDKs of developer portal 122 may include a set of development tools including, for example, a debugger, software libraries, APIs, documentation, sample code, tutorials, and so forth. The SDKs may provide these tools in an integrated development environment (IDE). The SDKs may allow OEMs and third parties to create software applications, such as OEM companion applications, for use with various operating systems (e.g., Android, iOS, etc.). The software application includes be a wearable-device-side software application and a primary-device-side software application. The SDKs provide access to and use of the services offered by developer portal 122 and activation platform 124.

Activation platform 124 may include one or more network devices to manage activation of cellular devices on the carrier network. Activation platform 124 may receive registration data, billing data, provisioning instructions, and other account settings for mobile devices. Activation platform 124 may communicate with network devices in core network 110—such as a home subscriber server (HSS)/authentication, authorization, and accounting (AAA) server, a policy and charging rules function (PCRF) device—to assign activation codes, unique identifiers, and authenticators for cellular devices, including wearable device 140.

Backhaul network 130 includes one or multiple networks of one or multiple types. According to an exemplary implementation, backhaul network 130 includes a backbone network. For example, the backbone network may be implemented as an optical transport network or other suitable architecture. According to an exemplary implementation, backhaul network 130 provides a connection path to service network 120. For example, wearable device 140 may transmit data to service network 120 via access network 105 and backhaul network 130 using a non-access stratum (NAS) control channel. According to an exemplary implementation, when access network 105 is implemented as an LTE RAN or an LTE-A RAN, backhaul network 130 may directly connect to an eNB. According to such an architecture, data transmitted using the NAS control channel may not traverse network elements of a complementary part of core network 110. In some instances, access network 105, core network 110, service network 120, and backhaul network 130 may be collectively referred to as a carrier network.

Wearable device 140 includes logic to collect, obtain, and/or generate data as a part of a wearable device service. According to an exemplary embodiment, wearable device 140 may include a communication interface via which wearable device 140 can transmit and receive data. For example, wearable device 140 may be implemented to include various technologies, such as a sensor, a tag, a camera, an antenna, etc., that collect, obtain, and/or generate data. According to various implementations, wearable device 140 may be a mobile device (e.g., attached or embedded to an animal or a person, attached to a drone, etc.). In some implementations, wearable device 140 may include a component (e.g., a Global Positioning System (GPS) chipset, etc.) that provides location-aware functionality. Wearable device 140 may be powered by an internal source, an external source, a battery, an outlet, electromagnetic waves, and so forth. In one example, wearable device 140 may take the form of a wristband-mounted device (like a wristwatch or activity tracker, as shown in FIGS. 5A-5G). Although not illustrated, other exemplary form factors for wearable device 140 may include a pendant style device configured for wearing via a chain or lanyard, a brooch or other pin-on or clip-on style device, a ring, etc. In some aspects, wearable device 140 may be an embedded device.

According to an exemplary embodiment, the communication interface for wearable device 140 includes a cellular modem, such as an LTE and/or an LTE-A modem (referred to herein as an "LTE modem"). In one implementation, the LTE modem may transmit and receive data using an LTE NAS control channel as a part of a data service provided by service network 120. The LTE NAS control channel can be used, for example, to transport small payloads (e.g., 256 bytes or less). For example, wearable device 140 may transmit data to service network 120 as a part of a data service and receive data from service network 120 as a part of a wearable device management service. According to another implementation, wearable device 140 may transmit data to partner server 160 or service network 120 via core network 110.

According to other embodiments, the communication interface of wearable device 140 includes a modem other than the LTE modem and Wearable device 140 transmits and receives data using conventional or well-known communication technologies other than the LTE NAS control channel. Thus, wearable device 140 may communicate with service network 120 via access network 105, core network 110, and/or backhaul network 130 via the communication interface. Wearable device 140 may also communicate with local devices (e.g., primary device 150) using various short-range communication technologies. For example, wearable device 140 may communicate with primary device 150 via Bluetooth (BT), Bluetooth Low-Energy (BLE), or Wi-Fi protocols.

According to an exemplary embodiment, wearable device 140 includes logic that communicates with a companion application on primary device 150 to provide cellular activation for wearable device 140 (e.g., on access network 105/core network 110). Processing for cellular activation may be split between a primary device SDK (e.g., executed on primary device 150) and a wearable SDK (e.g., executed on wearable device 140). An OEM (or third-party) device application on wearable device 140 may perform cellular activation—with either a preloaded subscriber identity module (SIM) or blank SIM—to completion without interacting directly with the SIM card or LTE modem on a low-level embedded system. For example, wearable device 140 includes SDK logic to establish a secure local connection with primary device 150, receive activation parameters and (if needed) a SIM profile over the secure local connection, and apply the activation parameters and the SIM profile to request activation for a particular wireless carrier.

Primary device 150 may include a communication and computational device. Primary device 150 may be implemented as a mobile device, a portable device, or a stationary device. For example, primary device 150 may be implemented as a smartphone, a tablet, a netbook, a computer (e.g., a laptop, a desktop, a palmtop, etc.), a personal digital assistant, a terminal, and so forth. In one implementation, primary device 150 may include a communication interface with a cellular modem (e.g., LTE modem) and a local wired/wireless interface (e.g., a universal serial bus (USB) port for communications over a cable, a BT/BTE interface, a NFC wireless interface, and/or a Wi-Fi interface. According to an exemplary embodiment, primary device 150 includes a companion application for wearable device 140 that includes an SDK for assisting with cellular activation of wearable device 140.

Partner server 160 may include a communication and computational device. In some implementations, partner server 160 may be included in a cloud environment that is separate from service network 120. In one implementation, partner server 160 may communicate with developer portal 122 to obtain SDKs that may be used to develop OEM device applications for wearable devices 140 and companion applications for primary devices 150. In another implementation, partner server 160 may collect data from wearable device 140 after wearable device is activated on access network 105. Partner server 160 may collect data directly from wearable device 140 or indirectly via services network 120.

Link 170 provides a communication path between network elements and/or networks of environment 100. Link 170 may have certain characteristics, such as bandwidth capacity, transmission data rate, and the like.

Figure 2:
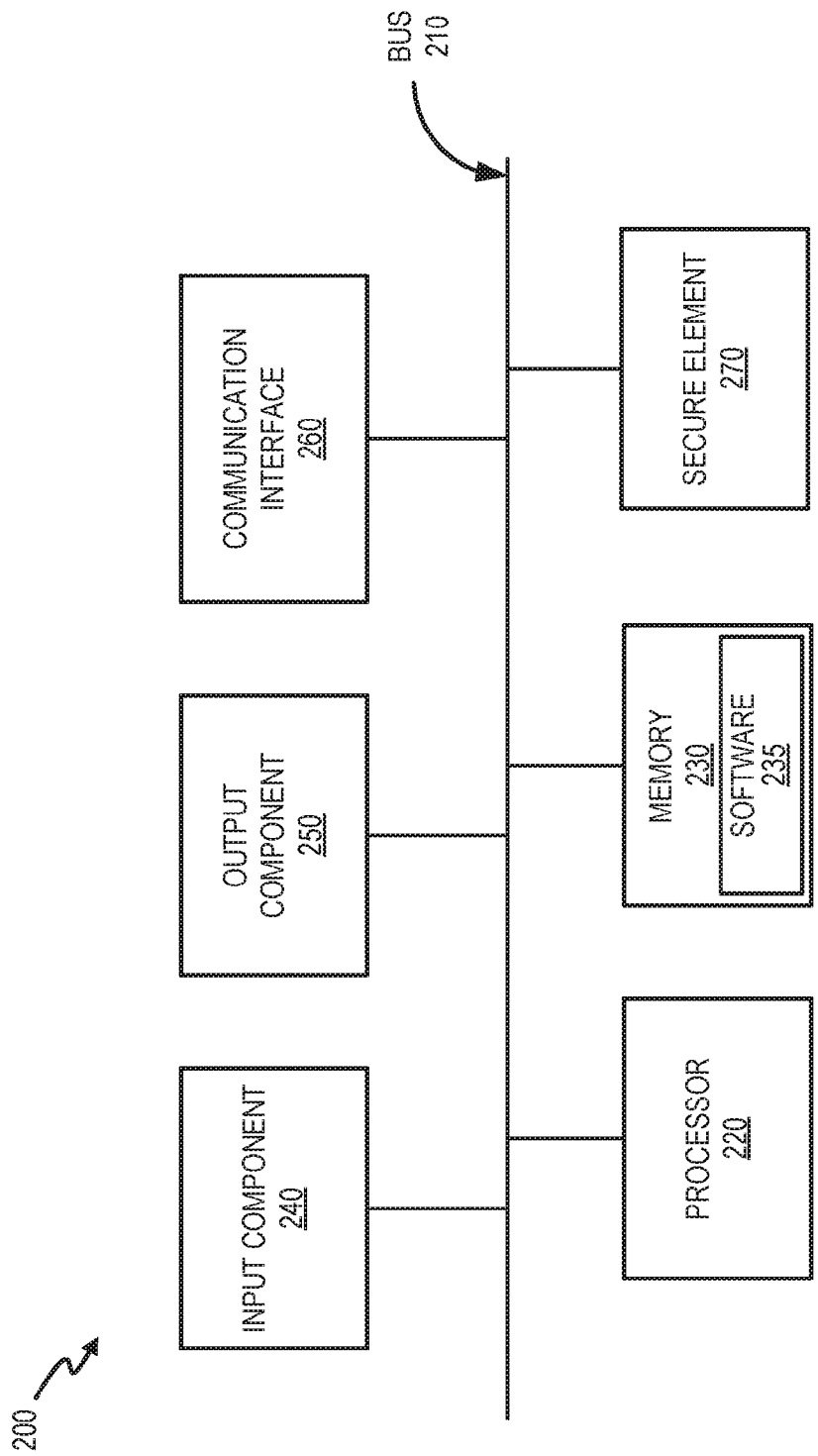
FIG. 2 is a block diagram illustrating exemplary components of a device that may correspond to a wearable device, user device, or a third-party server of FIG. 1.

FIG. 2 is a diagram illustrating exemplary components of a device 200, according to an implementation described herein. Each of wearable device 140, primary device 150, or partner server 160 may be implemented as a combination of hardware and software on one or more of device 200. As shown in FIG. 2, device 200 may include a bus 210, a processor 220, a memory 230, an input component 240, an output component 250, a communication interface 260, and a secure element 270.

Bus 210 may include a path that permits communication among the components of device 200. Processor 220 may include a processor, a microprocessor, or processing logic that may interpret and execute instructions. Memory 230 may include any type of dynamic storage device that may store information and instructions, for execution by processor 220, and/or any type of non-volatile storage device that may store information for use by processor 220.

Software 235 includes an application or a program that provides a function and/or a process. Software 235 is also intended to include firmware, middleware, microcode, hardware description language (HDL), and/or other form of instruction. By way of example, when device 200 is a wearable device 140, software 235 may include an OEM device application which uses a wearable SDK available from the service provider of service network 120. As another example, when device 200 is a primary device 150, software 235 may include an OEM companion application which uses a primary device SDK available from the service provider.

Input component 240 may include a mechanism that permits a user to input information to device 200, such as a keyboard, a keypad, a button, a switch, touch screen, etc. Output component 250 may include a mechanism that outputs information to the user, such as a display, a speaker, one or more light emitting diodes (LEDs), etc.

Communication interface 260 may include a transceiver that enables device 200 to communicate with other devices and/or systems via wireless communications, wired communications, or a combination of wireless and wired communications. For example, communication interface 260 may include mechanisms for communicating with another device or system via a network. Communication interface 260 may include an antenna assembly for transmission and/or reception of RF signals. For example, communication interface 260 may include one or more antennas to transmit and/or receive RF signals over the air. For example, when device 200 is a primary device 150, communication interface 260 may receive local RF signals over the air from, and transmit RF signals over the air to, wearable device 140. In one implementation, for example, communication interface 260 may communicate with a network and/or devices connected to a network. For example, when device 200 is a wearable device 140, communication interface 260 may communicate with peripheral devices (such as push button, thermal sensor, etc.) to receive activity event or collect data. Alternatively or additionally, communication interface 260 may be a logical component that includes input and output ports, input and output systems, and/or other input and output components that facilitate the transmission of data to other devices.

Secure Element (SE) 270 may be inserted into a secure element interface (e.g., a SIM card interface) of wearable device 140 or primary device 150. SE 270 may store secure applications and data to permit wearable device 140 or primary device 150 to perform secure exchanges with other network entities. In one embodiment, SE 270 may be permanently coupled to wearable device 140, and thus cannot be removed by a user. SE 270 may include, for example, a SIM, a universal subscriber identity module (USIM), a Universal Integrated Circuit Card (UICC), a removable user identity module (R-UIM), or an Internet Protocol (IP) multimedia services identity module (ISIM).

In general, SE 270 provides a tamper-resistant platform (e.g., a single-chip secure microcontroller) capable of securely hosting applications and/or their associated confidential and/or cryptographic data (e.g., key management) in accordance with the rules and security requirements set forth by a set of well-identified trusted authorities. SE 270 may be capable of securely storing applications (hereinafter referred to as "secure applications") and cryptographic data (such as, for example, secure keys). The secure information stored in SE 270 may be managed in accordance with rules and security requirements provided by established trusted authorities. Accordingly, SE 270 provides the security and confidentiality required to perform validation of a user's identity for access to core network 110, and/or support trusted exchanges among various network entities in networking environment 100.

Device 200 may perform certain operations in response to processor 220 executing software instructions (e.g., software 235) contained in a computer-readable medium, such as memory 230. A computer-readable medium may be defined as a non-transitory memory device. A non-transitory memory device may include memory space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Device 200 may include fewer components, additional components, different components, and/or differently arranged components than those illustrated in FIG. 2. As an example, in some implementations, a display may not be included in device 200. As another example, device 200 may include one or more switch fabrics instead of, or in addition to, bus 210. Additionally, or alternatively, one or more components of device 200 may perform one or more tasks described as being performed by one or more other components of device 200.

Figure 3:
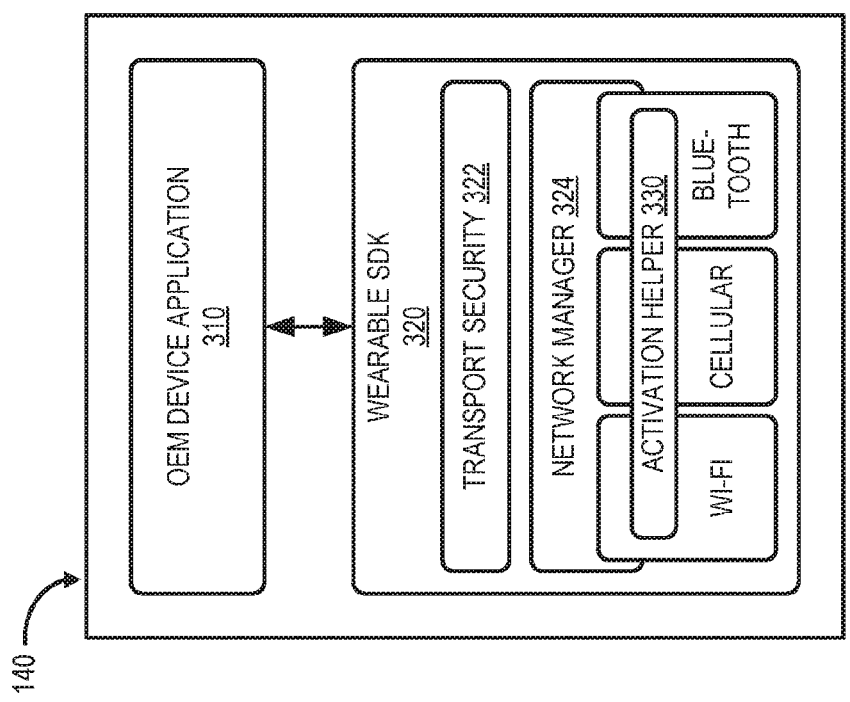
FIG. 3 is a diagram of functional components of the wearable device of FIG. 1.

FIG. 3 is a diagram of functional components of wearable device 140. The functional components of FIG. 3 may be implemented, for example, by processor 220 in conjunction with memory 230. As shown in FIG. 3, wearable device 140 may include an OEM device application 310 and a wearable SDK 320.

OEM device application 310 may include logic to manage functions of wearable device 140. For example, in one implementation, OEM device application 310 may include logic to collect and provide data from internal sensors or peripheral sensors associated with wearable device 140. OEM device application 310 may rely on wireless communications, and particularly cellular communications using access network 105, to perform these functions. In one implementation, OEM device application 310 may be implemented as a real-time operating system (RTOS). OEM device application 310 may also receive and store configuration settings, user profiles, and other user input to manage operation of wearable device 140. For example, OEM device application 310 may communicate with a companion application (e.g., OEM companion application 410) on a primary device (e.g., primary device 150) via a local wired or wireless connection to obtain user input and configuration settings for wearable device 140.

Wearable SDK 320 may include a client SDK that works in tangent with a primary device SDK (e.g., primary device SDK 420) on primary device 150 to facilitate activation of wearable device 140 on a cellular network (e.g., access network 105). Wearable SDK 320 may also handle direct communication with a SIM and LTE modem of wearable device 140. Particularly, wearable SDK 320 may conduct low-level communications with cellular hardware (e.g., the LTE modem and SIM) that allows the SIM to activate on the network. These low level communications may be transparent to OEM device application 310, thus simplifying development OEM device application 310. In one aspect, wearable SDK 320 may be implemented as middleware with hardware abstraction. Thus, OEM device application 310 may support a hardware-implementation-independent design to facilitate customization/replacement of communication hardware for the same service.

Wearable SDK 320 may include a transport security module 322, a network manager 324, and an activation helper 330. Transport security module 322 may ensure secure communications between wearable SDK 320 and a primary device SDK (e.g., primary device SDK 420) on primary device 150.

Network manager 324 may manage use of different communication networks to facilitate exchanges with the primary device SDK (e.g., primary device SDK 420). For example, network manager 324 may automatically select an available communication channel (e.g., BT, BLE, Wi-Fi, serial, etc.) available to exchange secured information (data) with the primary device SDK. Network manager 324 may also handle the complete cellular activation and subscription in response to a remote command from the primary device SDK over the (automatically) selected secured communication channel.

Activation helper 330 may communicate with an activation helper on the primary device SDK (e.g., primary device SDK 420) to obtain activation information, such as activation parameters and a SIM profile, that is necessary to activate wearable device 140 on the carrier network. Activation helper 330 may communicate over a secure communication network selected by network manager 324 using security protocols managed via transport security module 322. Activation helper 330 may install a SIM profile (when required) and generate an activation request using the received activation parameters.

FIG. 4 is a block diagram illustrating an exemplary functional component of primary device 150. The functional components of FIG. 4 may be implemented, for example, by processor 220 in conjunction with memory 230. In another implementation, some functional components of FIG. 4 may be implemented via a web browser interface in conjunction with partner server 160 or provider network 120. As shown in FIG. 4, primary device 150 may include an OEM companion application 410 and a primary device SDK 420.

OEM companion application 410 may generally include an application to manage settings for wearable device 140. In one implementation, wearable device 140 may be a programmable device that may be remotely configured, for example, by use of OEM companion application 410. OEM companion application 410 may provide an interface to allow a user to configure different settings for wearable device 140. In one implementation, OEM companion application 410 may include a setup module for an initial configuration of wearable device 140. The setup module may include a call (e.g., "startActivation( )") to primary device SDK 420 to initiate cellular service activation for wearable device 140. In other implementations, OEM companion application 410 may provide additional features (not shown) such as monitoring, sharing data, providing alerts, etc.

Primary device SDK 420 may perform subscription management for wearable device 140 and may pass parameters to perform activation of wearable device 140 if a subscription is valid. These actions, performed on primary device 150, are transparent to OEM companion application 410, as the OEM companion application 410 would only call a command (such as "startActivation( )") to initiate the activation process. In some instances, information collected by primary device SDK 420 to verify a subscription may be exchanged between the primary device SDK 420 and OEM companion application 410. This information may also be passed over a local network connection to wearable SDK 320. OEM companion application 410 may include a subscribe manager 422 and an activation helper 430.

Subscribe manager 422 may solicit user input to obtain information required to register with a cellular network. In one implementation, subscribe manager 422 may provide a webview user interface that can be incorporated into a "skin" or appearance of OEM companion application 410. In other words, the webview look and feel of the user interface may be customized to provide a consistent appearance with other features of OEM companion application 410. Subscribe manager 422 may handle all business logic associated with cellular activation through the webview. The webview may be served by activation platform 124 or other network devices in service network 120 or core network 110. As described further herein, the webview interface may solicit user account information. Subscribe manager 422 may provide the account information to, for example, activation platform 124 and obtain activation parameters (such as an activation code) for wearable device 140.

Activation helper 430 may obtain information needed for activation of wearable device 140 and may provide the information to wearable SDK 320. For example, activation helper 430 may receive the activation parameters from subscribe manager 422. Activation helper 430 may also determine if wearable device 140 needs a SIM profile. For example, wearable device 140 may come pre-configured with a SIM profile for a particular cellular carrier (e.g., that operates core network 110 and service network 120). In one implementation, activation helper 430 may query activation helper 330 of wearable device 140 to determine if wearable device 140 has a pre-loaded SIM profile. If activation helper 430 determines that wearable device 140 already has an active SIM profile, activation helper 430 may simply forward the activation parameters (e.g., as obtained by subscribe manager 422) to activation helper 330. If activation helper 430 determines that wearable device 140 does not include a SIM profile, activation helper 430 may obtain a new SIM profile for wearable device 140 from service network 120 and then forward the activation parameters and the new SIM profile to activation helper 330.

Detection of a SIM profile and/or obtaining a new SIM profile may be performed in a manner that is transparent to OEM device application 310 and OEM companion application 410. Thus, use of primary device SDK 420 and wearable SDK 320 may eliminate, for OEM developers, complexities such as detecting a SIM profile, conducting a SIM profile download, managing a SIM profile download failure, installing a SIM profile, and initiating a re-start of the LTE modem after a SIM profile installation. Use of primary device SDK 420 and wearable SDK 320 may also enable a manufacture of wearable device 140 to provide a single device for global platform, allowing a local SIM profile (e.g., for service provider of a particular country or continent) to be obtained upon device activation.

FIGS. 5A-5G are diagrams of exemplary communications among devices in a portion 500 of network environment 100. Communications in FIGS. 5A-5G may represent communications for activating a wearable device with assistance from a primary device. As shown in FIGS. 5A-5G, network portion 500 may include service network 120, wearable device 140, and primary device 150. Service network 120, wearable device 140, and primary device 150 may include features described above in connection with FIGS. 1-4.

A user of primary device 150 may use OEM companion application 410 to initiate activation of wearable device 140. For example, a user may download OEM companion application 410 from partner server 160 (not shown). OEM companion application 410 may invoke primary device SDK 420 to initiate cellular activation of wearable device 140. As shown in FIG. 5A, primary device 150 may present a start activation screen 505 to solicit user input to begin the activation process.

Figure 5B:
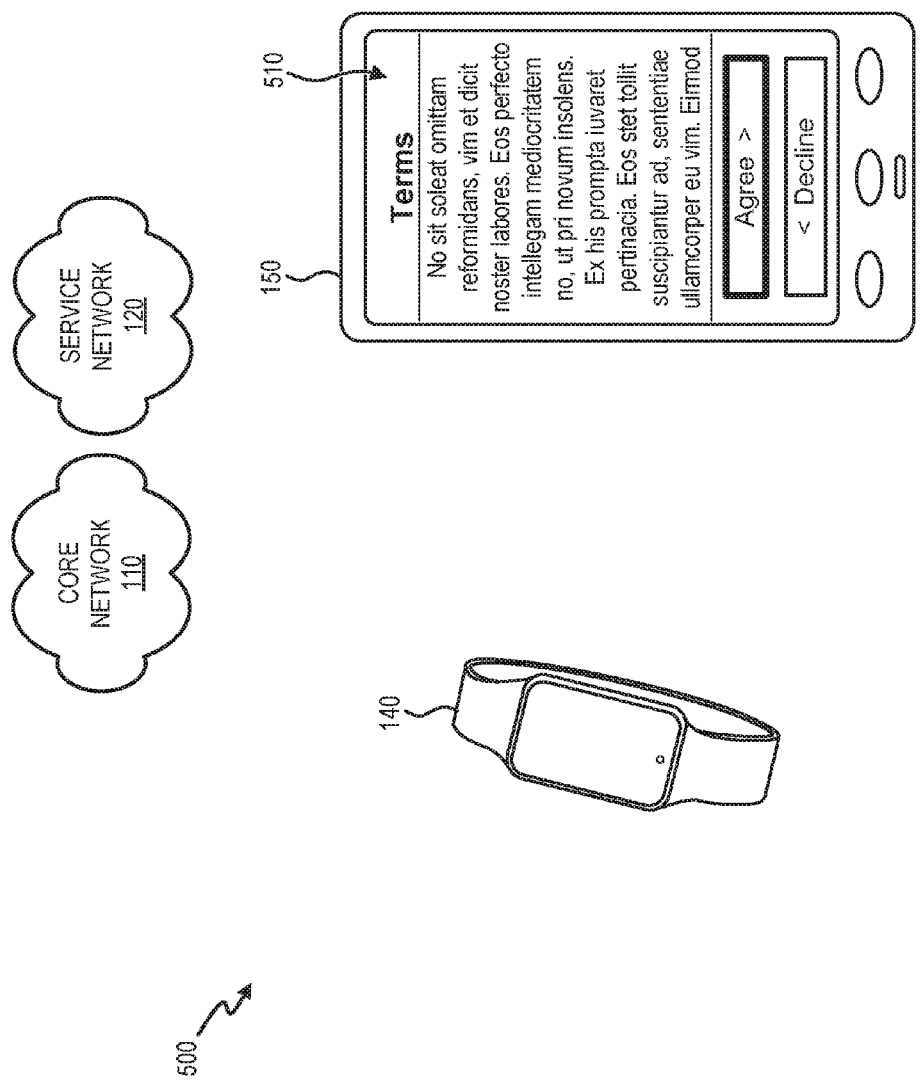

Assuming a user opts to start the activation process (e.g., by selecting the "Get started" icon of start activation screen 505), primary device 150 may present a terms and conditions screen 510, as shown in FIG. 5B. Terms and conditions screen 510 may present, for example, a description of rights and obligations associated with activating wearable device 140 on the carrier network. Terms and conditions screen 510 may also present an option for a user to accept or decline the terms and conditions.

Figure 5C:
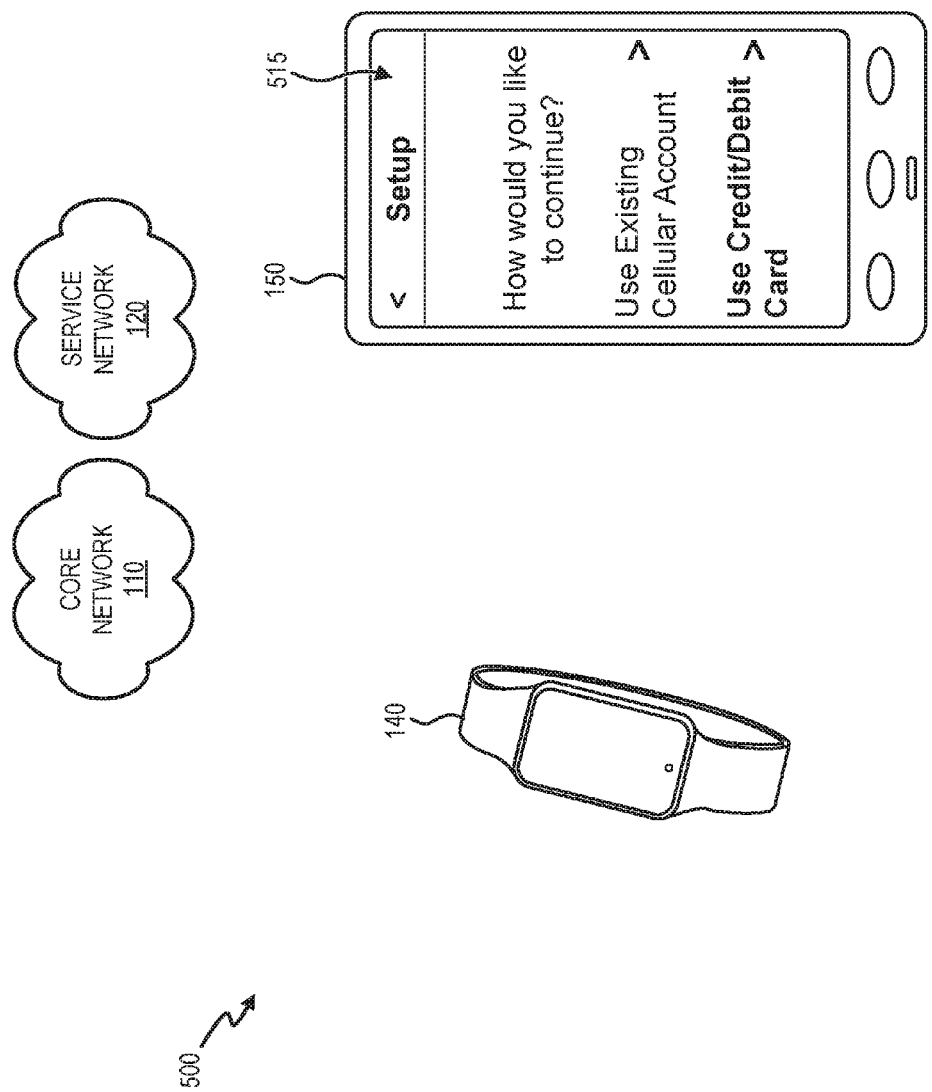

Assuming a user opts to accept the terms and conditions (e.g., by selecting the "Agree" icon of terms and conditions screen 510), primary device 150 may present a payment setup screen 515, as shown in FIG. 5C. Payment setup screen 515 may present, for example, billing options for cellular service with wearable device 140. In the example of FIG. 5C, billing options may include associating the newly activated service with an existing user account (e.g., "Use Existing Cellular Account") and arranging a recurring credit/debit card payment (e.g., "Use Credit/Debit Card").

Figure 5D:
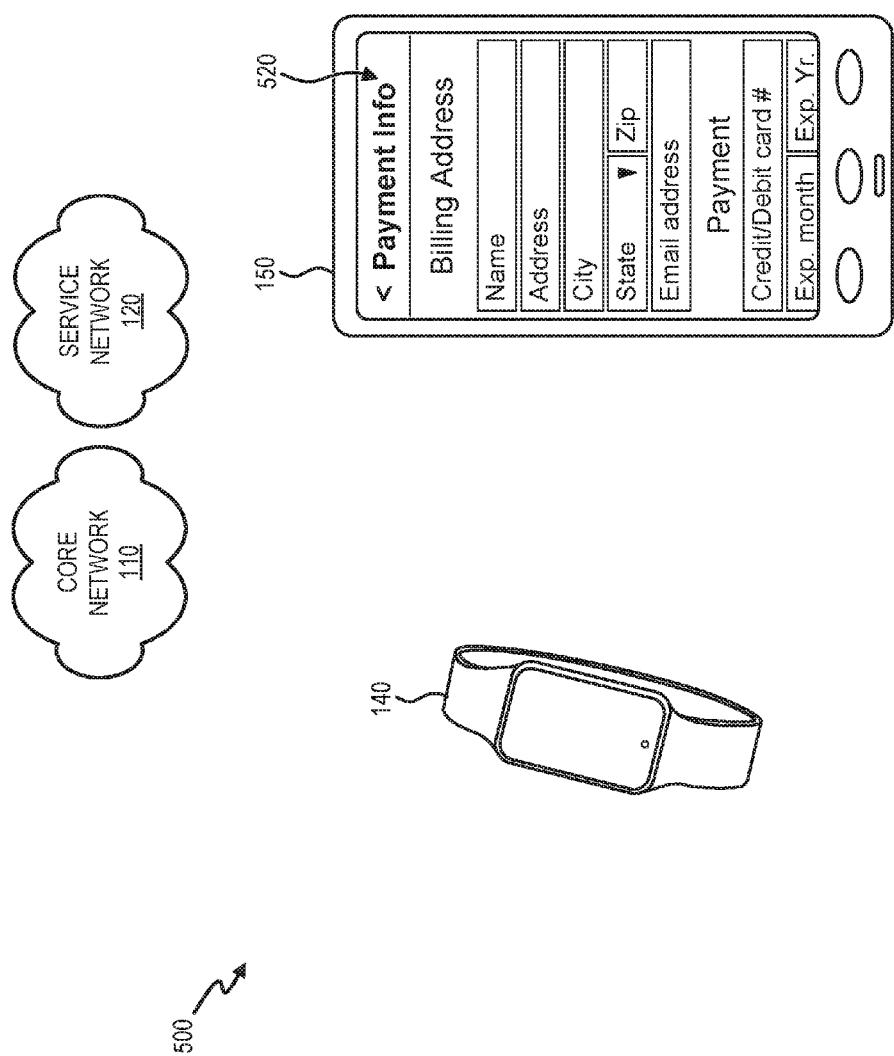

Assuming a user opts to arrange a recurring credit/debit card payment (e.g., by selecting the "Use Credit/Debit Card" option of payment setup screen 515), primary device 150 may present a payment information screen 520, as shown in FIG. 5D. Payment information screen 520 may solicit payment information (e.g., a credit card number and billing address) to be associated with cellular service for wearable device 140. A user may input data into the various fields of payment information screen 520.

Figure 5E:
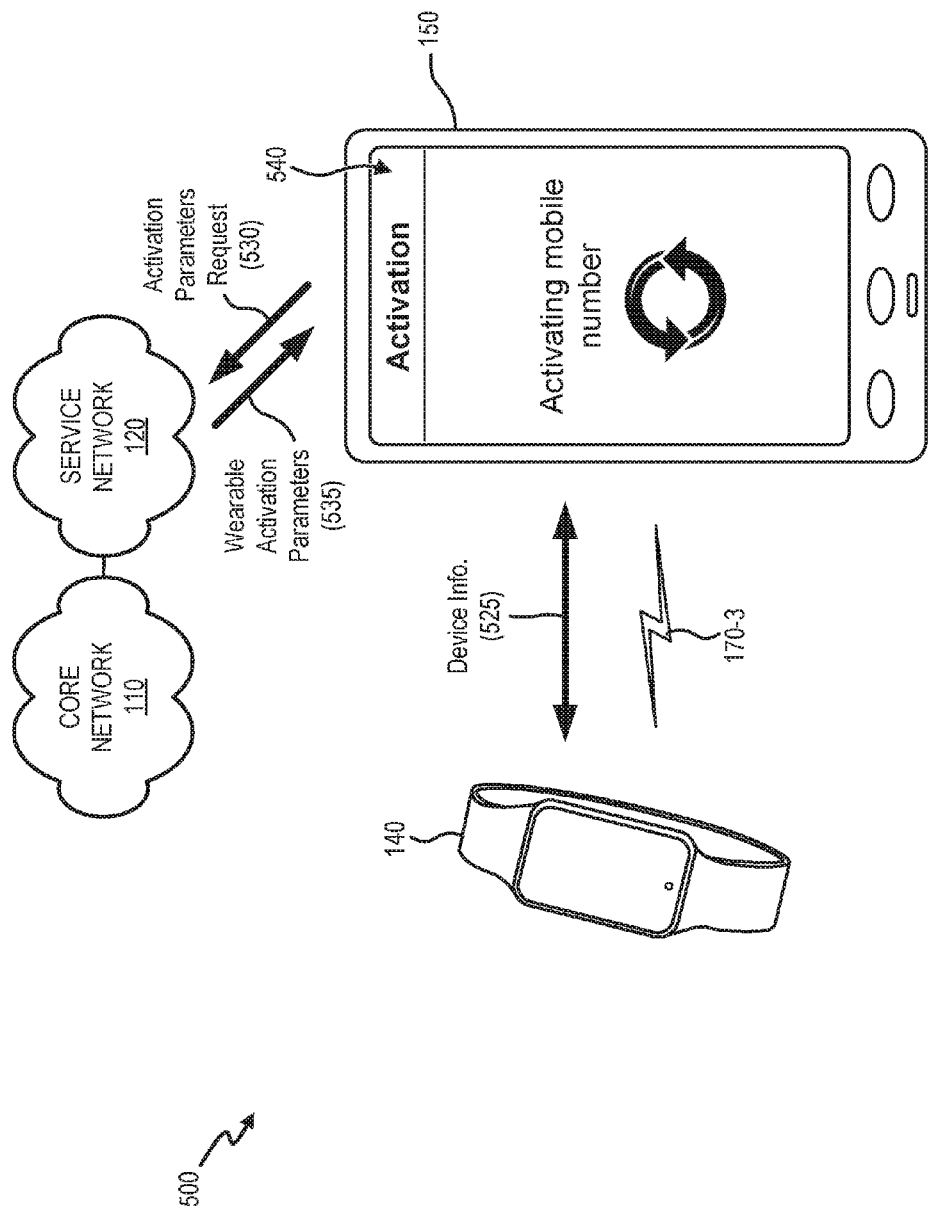

After obtaining appropriate billing information via payment information screen 520 (or after obtaining existing cellular account information), primary device 150 may verify wearable device 140 information and automatically initiate an activation process with service network 120. For example, as shown in FIG. 5E, primary device 150 (e.g., primary device SDK 420) and wearable device 140 (e.g., wearable SDK 320) may select an appropriate local communication interface over which to communicate (e.g., via link 170-3). Primary device 150 may obtain and/or verify device information from wearable device 140. Device information 525 for wearable device 140 may include, for example, a unique identifier, such as an International Mobile Subscriber Identity (IMSI), an International Mobile Station Equipment Identity (IMEI), a mobile equipment identifier (MEID), a universally unique identifier (UUID), another serial number, etc. Device information 525 may also include a device type, device model, device specifications, and the like. In some implementations, device information 525 may also include an indication of whether wearable device 140 includes an active SIM profile (e.g., a pre-loaded SIM profile).

Still referring to FIG. 5E, primary device 150 may provide an activation parameters request 530 to service network 120. Activation parameters request 530 may include, for example, device information (e.g., device information 525) and billing information (e.g., obtained in FIGS. 5C-5D) for wearable device 140. Activation parameters request 530 may cause service network 120 (e.g., activation platform 124) to assign activation parameters (such as an activation code) for wearable device 140 to be activated on the carrier network. In one implementation, service network 120 may exchange information with core network 110 to identify and assign the activation parameters. Service network 120 may provide the activation parameters to primary device 150 (e.g., primary device SDK 420) as wearable activation parameters 535. During the communication of device information 525, activation parameters request 530, and activation parameters 535, primary device 150 may present an activation screen 540 to the user, indicating backend processing.

Figure 5F:
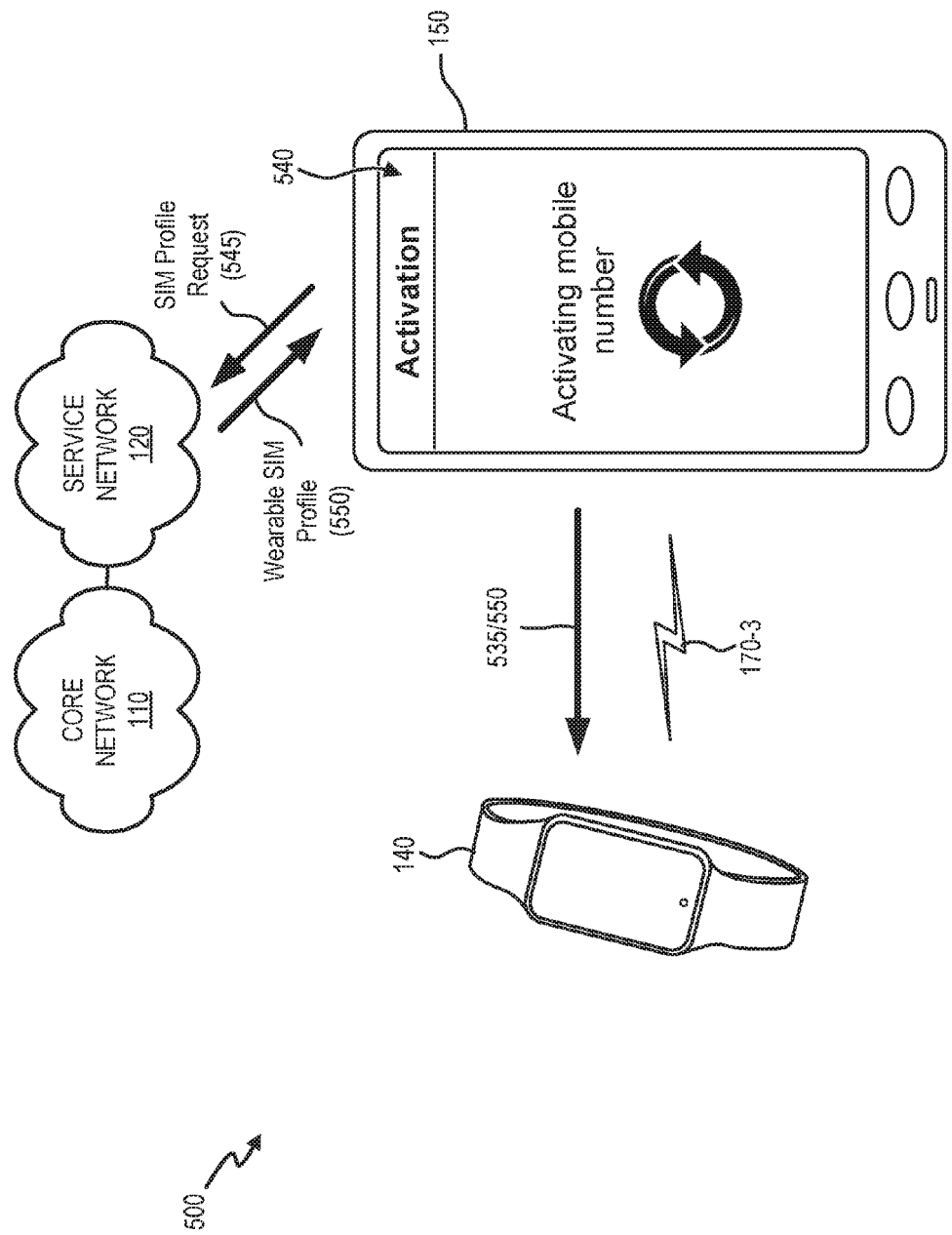

Referring to FIG. 5F, after obtaining activation parameters 535, primary device 150 (e.g., primary device SDK 420) may determine if a SIM profile is needed for wearable device 140. For example, based on device information 525, primary device 150 may determine that wearable device 140 does not have an active SIM profile and that a new SIM profile is needed. If a SIM profile for wearable device 140 is needed, primary device 150 may send a SIM profile request 545 to service network 120. SIM profile request 545 may include, for example, the unique identifier for wearable device 140. In response to SIM profile request 545, service network 120 may provide a wearable SIM profile 550 to primary device 150 (for use with SE 270 on wearable device 140). SIM profile 550 may include information to identify and authenticate wearable device 140 when attaching to the carrier network (e.g., access network 105 and/or core network 110). In one implementation, service network 120 may exchange information with core network 110 to identify and assign the SIM profile.

Still referring to FIG. 5F, primary device 150 may receive wearable SIM profile 550 and may provide activation parameters 535 and, if necessary, SIM profile 550 to wearable device 140 via local wireless link 170-3. Wearable device 140 may receive activation parameters 535, and possibly SIM profile 550, from primary device 150. In response, wearable device 140 (e.g., wearable SDK 320) may store the activation parameters. If required, wearable SDK 320 may also install SIM profile 550 and perform a re-start of the LTE modem on wearable device 140.

Figure 5G:
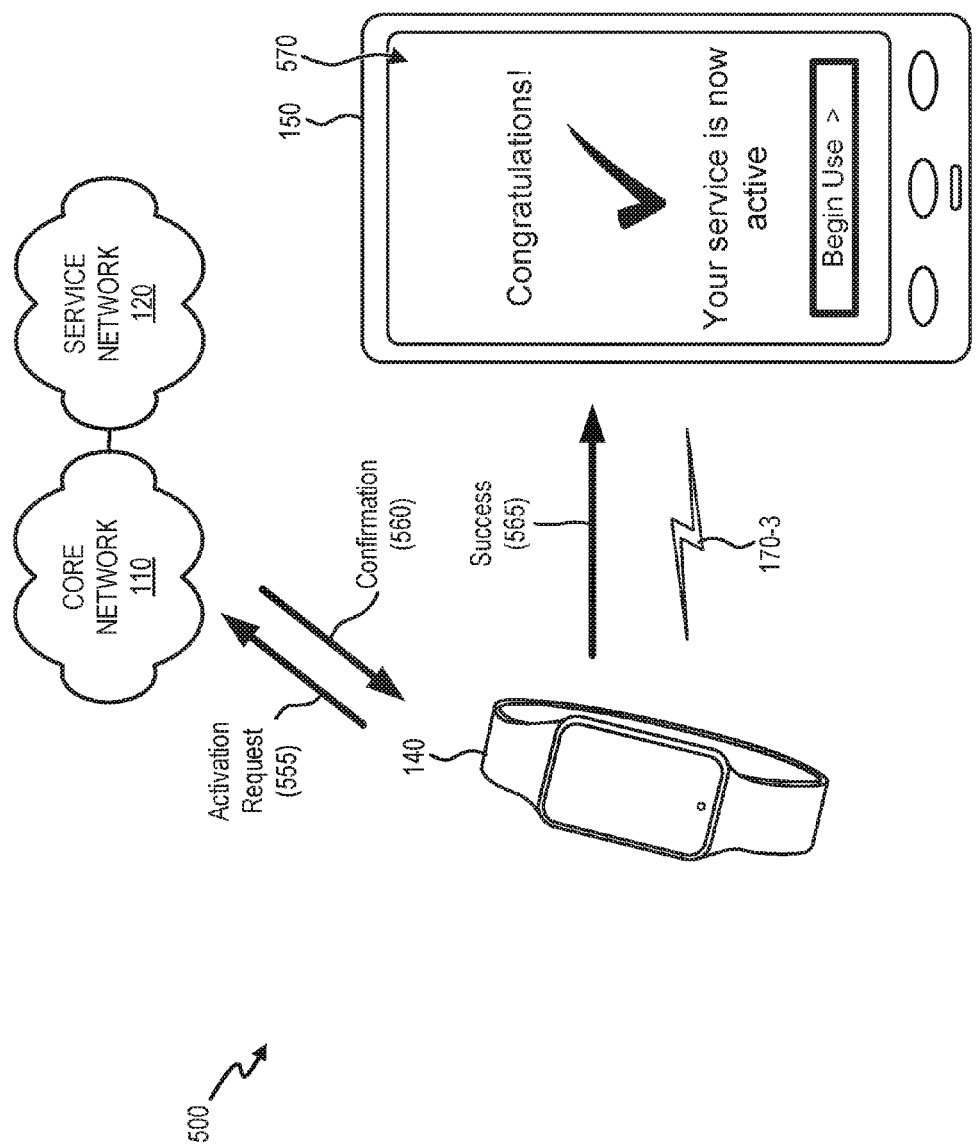

As shown in FIG. 5G, wearable device 140 may then send an activation request 555 to core network 110. Activation request 555 may include, for example, an activation code (e.g., from activation parameters 535). Assuming core network 110 receives a valid activation code and other information in activation request 555, wearable device 140 may be connected to the carrier network and core network 110 may provide a confirmation 560. Wearable device 140 may receive confirmation 560 and may provide a success indication 565 to primary device 150. Primary device 150 may receive success indication 565 and may present a completion screen 570, as shown in FIG. 5G. Completion screen 570 may indicate to a user that cellular activation of wearable device 140 was successful and may provide an option (e.g., "Begin use") for the user to continue using, for example, other features of OEM companion application.

Figure 6:
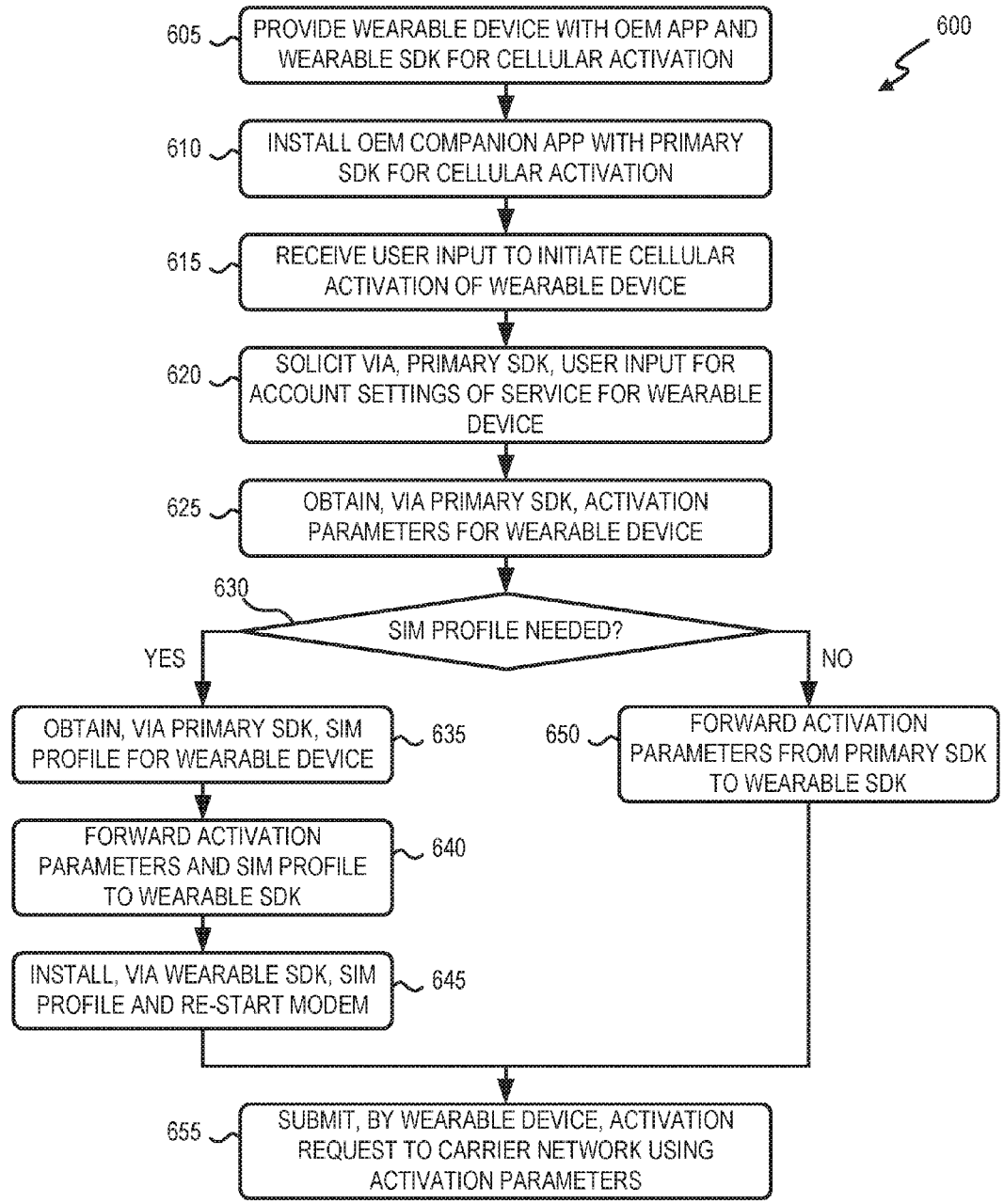
FIG. 6 is a flow diagram illustrating an exemplary process for implementing a notification service for connected wearable devices, according to an implementation described herein.

FIG. 6 is a flow diagram illustrating an exemplary process 600 for implementing a cellular activation service for a wearable devices according to an implementation described herein. In one implementation, process 600 may be performed by wearable device 140 and primary device 150. In another implementation, some or all of process 600 may be performed by another device or group of devices in network environment 100.

As shown in FIG. 6, process 600 may include providing a wearable device with an OEM device application having a wearable SDK for cellular activation (block 605), and installing an OEM companion application having a primary SDK for cellular activation (block 610). For example, wearable device 140 may be provided (e.g., for an initial sale to a consumer) with OEM device application 310 and wearable SDK 320. After purchase of wearable device 140, a consumer may download, to primary device 150, OEM companion application 410 that includes primary device SDK 420.

Process 600 may further include receiving user input to initiate cellular activation of the wearable device (block 615) and solicit via, the primary SDK, user input for account setting associated with cellular service for the wearable device (block 620). For example, a user of primary device 150 may use start activation screen 505 of OEM companion application 410 to initiate activation of wearable device 140. Primary device 150 may present payment setup screen 515 (FIG. 5C) and payment information screen 520 (FIG. 5D) to solicit existing account information or payment information (e.g., a credit card number and billing address) to be associated with cellular service for wearable device 140.

Process 600 may also include obtaining, via the primary SDK, activation parameters for wearable device (block 625), and determining if a SIM profile is needed (block 630). For example, primary device 150 may provide an activation parameters request 530 to service network 120. Activation parameters request 530 may include, for example, device information 525 and billing information for wearable device 140. Activation parameters request 530 may cause service network 120 to assign activation parameters enabling wearable device 140 to be activated on the carrier network. In one implementation, service network 120 may provide wearable activation parameters 535 to primary device SDK 420. Based on device information 525, primary device SDK 420 may determine if a SIM profile is needed for wearable device 140.

If a SIM profile is needed (block 630—Yes), process 600 may include obtaining, via the primary SDK, a SIM profile for the wearable device (block 635), forwarding the activation parameters and the SIM profile to the wearable SDK (block 640), and installing, via the wearable SDK, the SIM profile and re-starting the modem (block 645). For example, if a SIM profile for wearable device 140 is needed, primary device 150 may send a SIM profile request 545 to service network 120. In response to SIM profile request 545, service network 120 may provide a wearable SIM profile 550 to primary device 150. Primary device 150 may provide activation parameters 535 and SIM profile 550 to wearable device 140. Wearable device 140 (wearable SDK 320) may install SIM profile 550 and perform a re-start of the LTE modem on wearable device 140.

If a SIM profile is not needed (block 630—No), process 600 may include forwarding the activation parameters from the primary SDK to the wearable SDK (block 650). For example, if a SIM profile for wearable device 140 is not needed, primary device 150 may provide activation parameters 535 to wearable device 140.

Process 600 may also include submitting, by the wearable device, an activation request to the carrier network using the activation parameters (block 655). For example, wearable device 140 may send an activation request 555 to core network 110. Activation request 555 may include activation parameters 535. Assuming core network 110 receives valid activation parameters, wearable device 140 may be connected to the carrier network, and core network 110 may provide a confirmation 560.

According to implementations described herein, a user device may install an original equipment manufacturer (OEM) companion application with a primary software development kit (SDK) for cellular service activation on a wearable device. The wearable device may include an OEM device application having an embedded SDK for the cellular service activation. The user device may receive user input to initiate the cellular service activation for the wearable device and may solicit, via the primary SDK, user input for account settings associated with the cellular service activation. The user device may obtain, via the primary SDK and from a network device, activation parameters, associated with the wearable device, for the cellular service activation. The user device may forward, via the primary SDK and to the embedded SDK of the wearable device, the activation parameters, which the embedded SDK may use to request cellular activation.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 6, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A user device, comprising:
   a network interface with a transceiver to communicate with one or more remote devices;
   one or more memories to store a third-party companion application with a primary software development kit (SDK) for cellular service activation on a wearable device; and
   a processor to execute instructions in the third-party companion application to:
      install the third-party companion application,
      receive input to initiate the cellular service activation for the wearable device,
      solicit, via the primary SDK, user input for account settings associated with the cellular service activation,
      obtain, via the primary SDK and from a network device, activation parameters, associated with the wearable device, for the cellular service activation, and
      forward, by the primary SDK and to an embedded SDK of the wearable device, the activation parameters.

2. The user device of claim 1, wherein the processor is further to:
   determine whether a subscriber identity module (SIM) profile is required for the wearable device;
   obtain, from the network device, the SIM profile, when the SIM profile is required for the wearable device; and
   forward, to the wearable device, the SIM profile along with the activation parameters, when the SIM profile is required for the wearable device.

3. The user device of claim 2, wherein the activation parameters include an activation code for the cellular service activation.

4. The user device of claim 1, wherein, when forwarding the activation parameters, the processor is further to:
   initiate a secure local wireless connection between the user device and the wearable device; and
   forward the activation parameters over the secure local wireless connection.

5. The user device of claim 4, wherein the secure local wireless connection comprises a connection using one of a Bluetooth protocol, a Bluetooth Low-Energy protocol, a Wi-Fi protocol, or a Near-Field communication protocol.

6. The user device of claim 1, wherein, when soliciting user input for the account settings, the processor is further to:
   provide, via the primary SDK, a webview user interface for the user that is customized to match a look and feel of the third-party companion application.

7. The user device of claim 1, wherein the embedded SDK of the wearable device includes hardware abstraction.

8. The user device of claim 1, wherein the activation parameters are included in an activation request, for cellular activation, submitted to a network device by the wearable device.

9. A method performed by a user device, the method comprising:
   installing, by the user device, a third-party companion application with a primary software development kit (SDK) for cellular service activation on a wearable device, the wearable device including a third-party device application having an embedded SDK for the cellular service activation;

receiving, by the user device, input to initiate the cellular service activation for the wearable device;

soliciting, via the primary SDK, user input for account settings associated with the cellular service activation;

obtaining, via the primary SDK and from a network device, activation parameters, associated with the wearable device, for the cellular service activation; and forwarding, by the primary SDK and to the embedded SDK of the wearable device, the activation parameters.

10. The method of claim 9, further comprising:

determining, by the user device, whether a Subscriber Identity Module (SIM) profile is required for the wearable device;

obtaining, by the user device and from the network device, the SIM profile, when the SIM profile is required for the wearable device; and forwarding, by the user device and to the wearable device, the SIM profile along with the activation parameters, when the SIM profile is required for the wearable device.

11. The method of claim 9, wherein the activation parameters include an activation code for the cellular service activation of the wearable device.

12. The method of claim 9, wherein forwarding the activation parameters further comprises:

initiating a secure local wireless connection between the user device and the wearable device; and forwarding the activation parameters over the secure local wireless connection.

13. The method of claim 12, wherein the secure local wireless connection comprises a connection using one of a Bluetooth protocol, a Bluetooth Low-Energy protocol, a Wi-Fi protocol, or a Near-Field communication protocol.

14. The method of claim 9, wherein, when soliciting user input for the account settings, the primary SDK provides a webview user interface for the user that is customized to match a look and feel of the third-party companion application.

15. The method of claim 9, wherein the embedded SDK of the wearable device includes hardware abstraction.

16. The method of claim 9, wherein the activation parameters are included in an activation request, for cellular activation, submitted to a network device by the wearable device.

17. A non-transitory computer-readable medium storing instructions executable by a computational device to:

install a third-party companion application with a primary software development kit (SDK) for cellular service activation on a wearable device, the wearable device including a third-party device application having an embedded SDK for the cellular service activation;

receive input to initiate the cellular service activation for the wearable device;

solicit, via the primary SDK, user input for account settings associated with the cellular service activation;

obtain, via the primary SDK and from a network device, activation parameters, associated with the wearable device, for the cellular service activation; and forward, by the primary SDK and to the embedded SDK of the wearable device, the activation parameters.

18. The non-transitory computer-readable medium of claim 17, further comprising instructions to:

determine whether a subscriber identity module (SIM) profile is required for the wearable device;

obtain, from the network device, the SIM profile, when the SIM profile is required for the wearable device; and forward, to the wearable device, the SIM profile along with the activation parameters, when the SIM profile is required for the wearable device.

19. The non-transitory computer-readable medium of claim 17, wherein the instructions to forward the activation parameters further comprise instructions to:

forward the activation parameters over a secure local wireless connection.

20. The non-transitory computer-readable medium of claim 17, wherein the activation parameters include an activation code for the cellular service activation.

* * * * *